(12) United States Patent
Tang

(10) Patent No.: US 10,175,357 B2
(45) Date of Patent: Jan. 8, 2019

(54) LASER RANGE FINDING SENSOR AND RANGE FINDING METHOD THEREOF

(71) Applicant: Ecovacs Robotics Co., Ltd., Suzhou, Jiangsu (CN)

(72) Inventor: Jinju Tang, Suzhou (CN)

(73) Assignee: Ecovacs Robotics Co., Ltd., Suzhou (CN)

(*) Notice: Subject to any disclaimer, the term of this patent is extended or adjusted under 35 U.S.C. 154(b) by 401 days.

(21) Appl. No.: 15/038,328

(22) PCT Filed: Nov. 21, 2014

(86) PCT No.: PCT/CN2014/091848
§ 371 (c)(1),
(2) Date: May 20, 2016

(87) PCT Pub. No.: WO2015/074594
PCT Pub. Date: May 28, 2015

(65) Prior Publication Data
US 2016/0291158 A1    Oct. 6, 2016

(30) Foreign Application Priority Data

Nov. 21, 2013    (CN) .......................... 2013 1 0591303

(51) Int. Cl.
*G01C 3/08* (2006.01)
*G01S 17/42* (2006.01)
(Continued)

(52) U.S. Cl.
CPC .............. *G01S 17/42* (2013.01); *G01B 11/00* (2013.01); *G01C 3/00* (2013.01); *G01D 5/3473* (2013.01);
(Continued)

(58) Field of Classification Search
CPC ........ G01S 17/42; G01S 7/4817; G01S 7/497; G01S 17/08; G01S 7/4813; G01B 11/00; G01C 3/00; G01D 5/3473
See application file for complete search history.

(56) References Cited

U.S. PATENT DOCUMENTS 4,849,954 A * 7/1989 Yamaguchi .......... G11B 7/0956
                                                        369/53.19
5,495,458 A * 2/1996 Ikeda ................. G11B 7/08505
                                                        369/30.1
(Continued)

FOREIGN PATENT DOCUMENTS

CN          1590956 A       3/2005
CN        101910867 A      12/2010
(Continued)

*Primary Examiner* — Samantha K Abraham
(74) *Attorney, Agent, or Firm* — Nixon Peabody LLP

(57) ABSTRACT

Disclosed are a laser range finding sensor and a range finding method therefor. The laser range finding sensor comprises a motor (120), a control box (130), and a coded disc (150). Under a drive of the motor, the control box rotates relative to the coded disc. The coded disc comprises a plurality of range finding teeth (151). The control box comprises a range finding unit (142), a detection portion (144), and a control unit (140). The detection portion comprises a light transmitter (1440) and a light receiver (1441) disposed opposite to each other. The control box rotates relative to the coded disc, so that the range finding teeth pass between respective positions of the light transmitter and the light receiver. The control box rotates under the drive of the motor for scanning and distance measuring and records a measured distance value in the control unit. The control unit automatically calculates a corresponding local rotation speed when the coded disc rotates by a set angle. The control unit is connected to a rotation speed feedback and adjustment unit configured to adjust the rotation speed of the (Continued)

motor so that the control box is rotated at a constant speed. The laser range finding sensor has a simple structure, needs a low cost, and has a high sensitivity.

10 Claims, 3 Drawing Sheets

(51) Int. Cl.
  *G01S 7/481* (2006.01)
  *G01S 7/497* (2006.01)
  *G01D 5/347* (2006.01)
  *G01C 3/00* (2006.01)
  *G01S 17/08* (2006.01)
  *G01B 11/00* (2006.01)

(52) U.S. Cl.
  CPC ............ *G01S 7/4817* (2013.01); *G01S 7/497* (2013.01); *G01S 17/08* (2013.01); *G01S 7/4813* (2013.01)

(56) References Cited

U.S. PATENT DOCUMENTS

| | | | | |
|---|---|---|---|---|
| 5,835,459 A | * | 11/1998 | Takahara | G11B 7/00718 369/44.28 |
| 6,404,710 B1 | * | 6/2002 | Ichimura | G11B 7/0903 369/112.23 |
| 6,404,726 B1 | * | 6/2002 | Makita | G11B 7/08576 369/222 |
| 8,059,509 B2 | * | 11/2011 | Bakx | G11B 19/12 369/53.2 |
| 8,692,979 B2 | | 4/2014 | Moench et al. | |
| 2005/0024625 A1 | * | 2/2005 | Mori | G01C 15/002 356/4.01 |
| 2013/0098139 A1 | * | 4/2013 | Adams, Jr. | G01B 11/0616 73/7 |
| 2013/0308118 A1 | * | 11/2013 | Hsu | G01S 17/08 356/4.01 |
| 2013/0317649 A1 | * | 11/2013 | Larson | G01S 17/42 700/259 |

FOREIGN PATENT DOCUMENTS

| | | |
|---|---|---|
| CN | 203249618 U | 10/2013 |
| CN | 203642908 U | 6/2014 |
| EP | 2503662 A2 | 9/2012 |
| JP | H07-032516 U | 6/1995 |
| JP | 116710 A | 1/1999 |
| JP | 2002511928 A | 4/2002 |
| JP | 2003207371 A | 7/2003 |
| JP | 2008298520 A | 12/2008 |
| JP | 2011257221 | 12/2011 |
| JP | 3178159 U | 9/2012 |
| JP | 2013003114 A | 1/2013 |
| JP | 5626770 B2 | 11/2014 |
| WO | WO 98/52089 A1 | 11/1998 |

\* cited by examiner

LASER RANGE FINDING SENSOR AND RANGE FINDING METHOD THEREOF

CROSS-REFERENCE TO RELATED APPLICATIONS

This application is a U.S. national stage of PCT/CN2014/091848, filed on Nov. 21, 2014, which claims priority to Chinese Patent Application No. 201310591303.0, filed on Nov. 21, 2013, the contents of which are each incorporated herein by reference in its entirety.

FIELD OF THE INVENTION

The present invention relates to a laser range finding sensor and a range finding method therefor, which belongs to a technical field of laser measuring instrument.

BACKGROUND ART

In the prior art, the patent document with publication No. CN101885110A discloses a rotational position detecting apparatus that uses two rotators having different periods of rotation. Each rotator is provided with one or more claws and corresponding claw sensors for detecting the angle and number of rotation. As a result, the manufacturing cost of the detecting apparatus is increased due to the provision of the plurality of rotators, and the adjustment and maintenance cost is increased due to the increased number of components.

SUMMARY OF THE INVENTION

In view of the deficiencies in the prior art, the technical objective of the present invention to provide a laser range finding sensor and a range finding method therefor. The laser range finding sensor obtains a scanning data by synchronously scanning a coded disc, and with the help of a rotation speed feedback and adjustment unit, the laser range finding sensor precisely controls the rotation speed of the coded disc by automatically calculating a real-time rotation speed via a photoelectric encoder, inputting the real-time rotation speed in a control unit, and comparing the real-time rotation speed with a preset threshold of the rotation speed, hereby obtaining distance information on the two-dimensional cross section of each degree in one revolution. The sensor has a simple structure and a high sensitivity.

The technical objective of the present invention is realized by the following technical solutions:

A laser range finding sensor comprises a motor, a control box and a coded disc. Under a drive of the motor, the control box rotates relative to the coded disc; the coded disc comprises a plurality of range finding teeth; the control box comprises a range finding unit, a detection portion and a control unit, the detection portion comprises a light transmitter and a light receiver disposed opposite to each other; the control box rotates relative to the coded disc no that the range finding teeth pass between respective positions of the light transmitter and the light receiver; the control box rotates under the drive of the motor for scanning and distance measuring, and records a measured distance value in the control unit; the control unit automatically calculates a corresponding local rotation speed when the coded disc rotates by a set angle; and the control unit is connected to a rotation speed feedback and adjustment unit configured to adjust the rotation speed of the motor so that the control box is rotated at a constant speed.

In order to facilitating monitoring and adjusting the rotation speed of the motor, when the control box rotates anticlockwise, the set angle is an angle across which the left edges of every two adjacent range finding teeth among the plurality of range finding teeth evenly provided on the circumference of the coded disc span.

In order to facilitate fixing the coded disc, the laser range finding sensor further comprises a base on which the coded disc is fixed.

In order to rotatably connect the control box to the base, an output terminal of the motor is provided with a motor pulley, and an O-ring is fitted around the outer circumferences of the motor pulley and the control box. The middle portion of the base is connected with a bearing which has an outer race is fixed to the base and an inner race fixed to the control box.

In consideration of both aspects of sensitivity and efficiency, the number of the range finding teeth provided on the circumference of the coded disc may be 5-15.

In order to facilitate identifying the initial position of the laser scanning, a tooth width of one range finding tooth among the 5-15 range finding teeth may be smaller or larger than that of the rest range finding teeth.

In a specific embodiment, the coded disc comprises 15 range finding teeth among which an interval between the left edges of every two adjacent range finding teeth is 24 degrees, an interval between the left and right edges of one range finding tooth is 6 degrees, an interval between the right edge of the one range finding tooth and the left edge of the range finding tooth adjacent to said one range finding tooth on the right side is 18 degrees, and an interval between the left and right sides of each of other range finding tee is 12 degrees.

The present invention further provides orange finding method for the laser range finding sensor mentioned above, and the method comprise the following steps:

Step 100: anticlockwise rotating a coded disc in the range finding sensor with a motor, wherein the motor has an initial rotation speed N1;

Step 200: measuring a distance value within a set angle as orange finding unit; and by a photoelectric encoder, automatically calculating a local rotation speed N2 of the motor within the range finding unit, and sending the local rotation speed N2 to the control unit;

Step 300: in the control unit, presetting a first threshold NO for the rotation speed of the motor;

Step 400: determining whether the local rotation speed N2 is within the range of the first threshold NO, if YES, proceeding to Step 500, and if NO, resetting the rotation speed of the motor to the initial rotation speed N1 by adjusting a circuit voltage by the control unit, and returning to Step 100; and Step 500: recording the distance value of Step 200 in the control unit.

The set angle in Step 200 is an angle across which the edges on the same side of every two adjacent teeth among the plurality of range finding teeth on the coded disc span.

The initial rotation speed N1 is 5-15 rev/sec.

In conclusion, the present invention provides a laser range finding sensor and a range finding method therefor. The laser range finding sensor obtains a scanning data by synchronously scanning a coded disc, and with the help of a rotation speed feedback and adjustment unit, the laser range finding sensor precisely controls the rotation speed of the coded disc by automatically calculating a real-time rotation speed via a photoelectric encoder, inputting the real-time rotation speed in a control unit, and comparing the real-time rotation speed with a preset threshold of the rotation speed, hereby obtaining distance information about the two-dimensional cross section of each degree in one revolution. The sensor has a simple structure and a high sensitivity.

Hereinafter, the technical solutions of the present invention will be described in detail with referent to the drawings and specific embodiments.

DESCRIPTION OF ATTACHED DRAWINGS

DETAILED DESCRIPTION OF PREFERRED EMBODIMENT

First Embodiment

Figure 1:
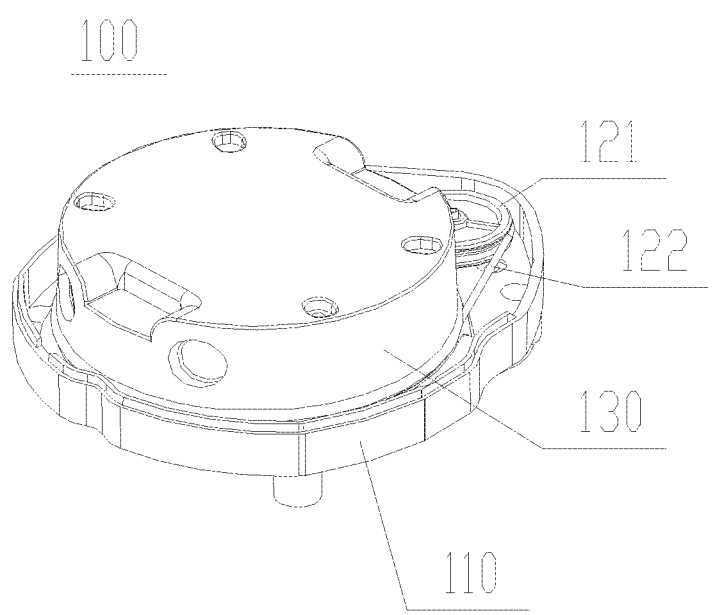
FIG. 1 is a schematic view of an overall structure of a laser range finding sensor according to the present invention.
Figure 2:
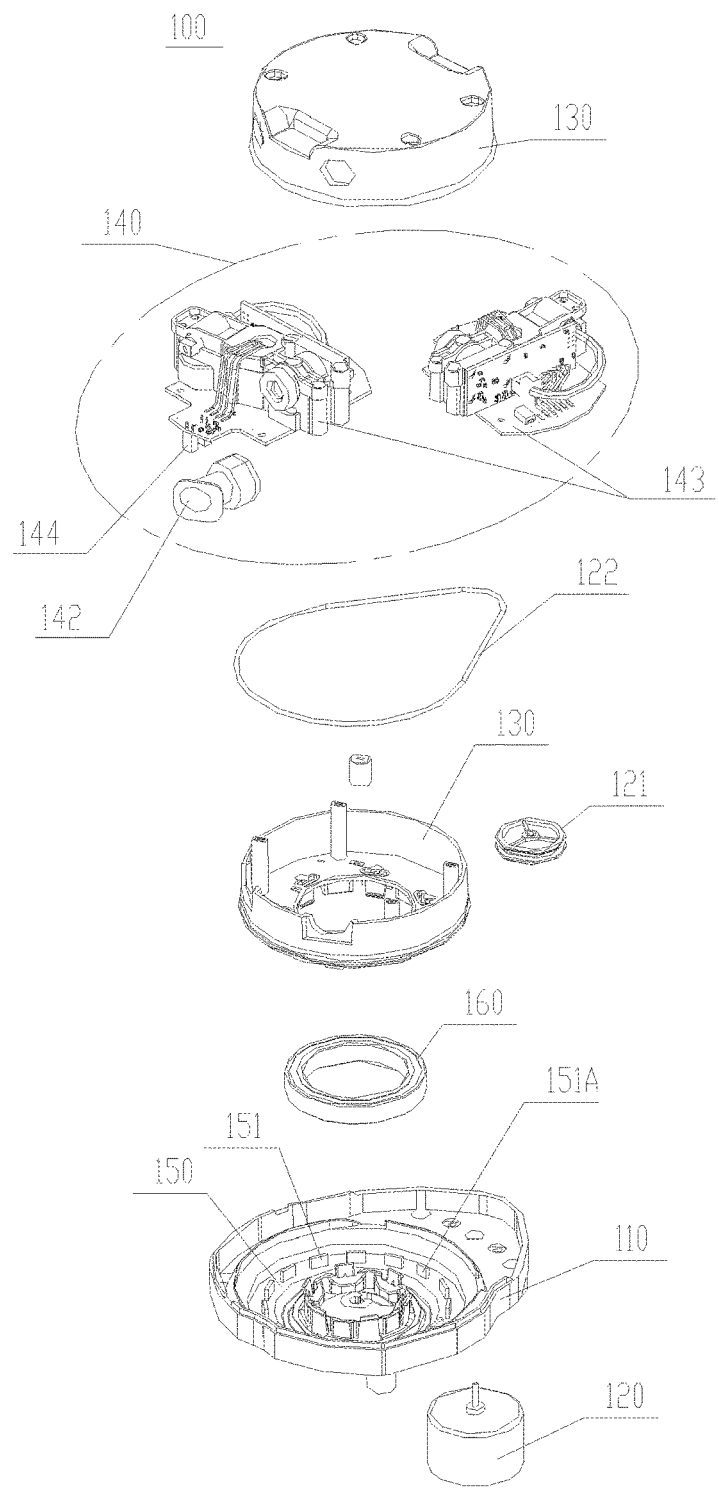
FIG. 2 is a view of an internal structure of the laser range finding sensor according to the present invention.

FIG. 1 is a schematic view of an overall structure of a laser range finding sensor according to the present invention, and FIG. 2 is a view of an internal structure of the laser range finding sensor according to the present invention. As shown in FIG. 1 in combination with FIG. 2, the present invention provides a laser range finding sensor 100 comprising a motor 120, a control box 130 and a coded disc 150. Under the drive of the motor 120, the control box 130 rotates relative to the coded disc 150. The coded disc 150 comprises a plurality of range finding teeth 151. The control box 130 comprises orange finding unit 142, a detection portion 144 and a control unit 140. The detection portion 144 comprises a light transmitter 1440 and a light receiver 1441 disposed opposite to each other. The control box 130 rotates relative to the coded disc 150 so that the range finding teeth 151 pass between respective positions of the light transmitter 1440 and the light receiver 1441. The control box 130 rotates under the drive of the motor 120 for scanning and distance measuring, and records the measured distance value in the control unit 140. Meanwhile, the control unit 140 automatically calculates a corresponding local rotation speed N2 when the coded disc 150 rotates by a set angle. The control unit 140 is connected to a rotation speed feedback and adjustment unit configured to adjust the rotation speed of the motor 120 so that the control box 130 is rotated at a constant speed.

Figure 3:
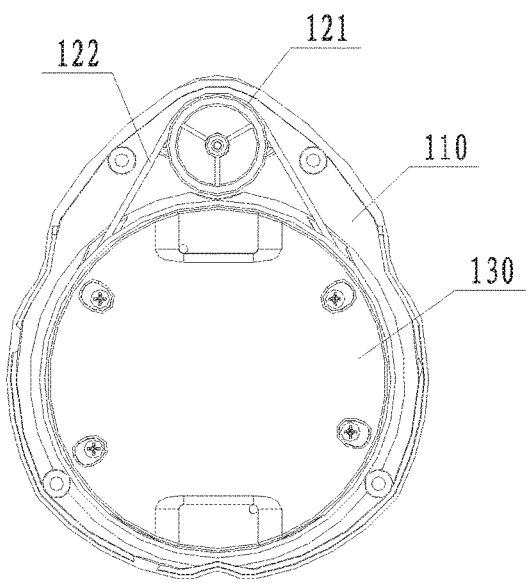
FIG. 3 is a plan view of the laser range finding sensor according to the present invention.

FIG. 3 is a plan view of the laser range finding sensor according to the present invention. As shown in FIG. 3 in combination with FIGS. 1-2, in order to rotatably connect the control box 130 to a base 110, an output terminal of the motor 120 is provided with a motor pulley 121, and an O-ring 122 is fitted around the outer circumferences of the motor pulley 121 and the control box 130. The middle portion of the base 110 is connected with a bearing 160 which has an outer race fixed to the base 110 and an inner race fixed to the control box 130.

In order to facilitate monitoring and adjusting the rotation speed of the motor 120, when the control box 130 rotates anticlockwise, the set angle is an angle across which the left edges of every two adjacent range finding teeth among the plurality of range finding teeth 151 evenly provided on the circumference of the coded disc span. In consideration of both aspects of sensitivity and efficiency, the number of the range finding teeth provided on the circumference of the coded disc may be 5-15. Further, in order to facilitate identifying the initial position of the laser scanning, the tooth width of one of the 5-15 range finding teeth is smaller or larger than that of other range finding teeth.

Figure 4:
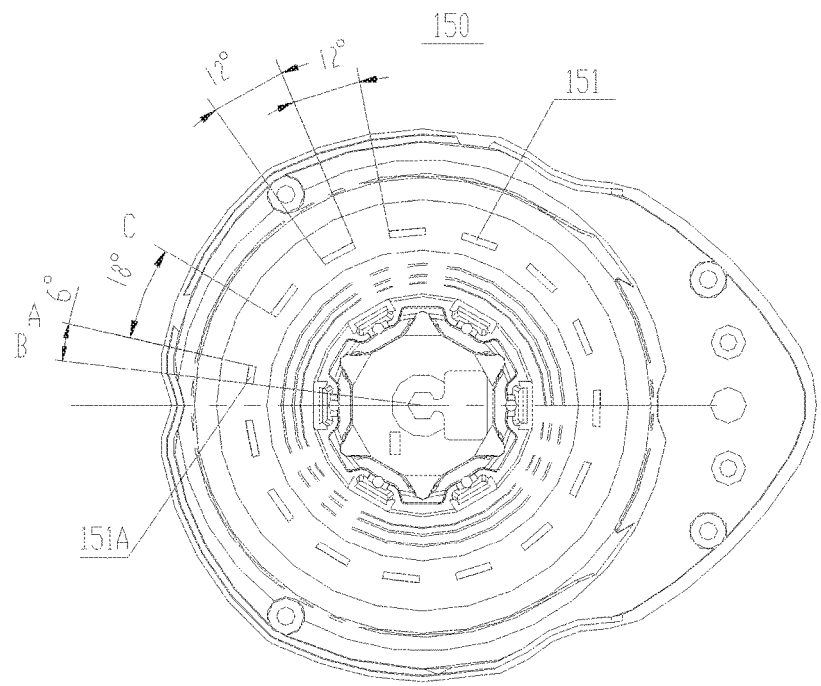
FIG. 4 is a schematic view of a coded disc according to a first embodiment of the present invention.

FIG. 4 is a schematic view of a coded disc according to a first embodiment of the present invention. As shown in FIG. 4, in the first embodiment, 15 range finding teeth 151 are evenly provided on the circumference of the coded disc 150, and the interval between the left edges of two adjacent range finding teeth is 24 degrees. Further, among the 15 range finding teeth, there is one range finding tooth 151A, the interval between the left and right edges of which is 6 degrees, and the tooth width of which is slightly smaller than that of other range finding teeth. The interval between the right edge of said one range finding tooth and the left edge of the range finding tooth adjacent to said one range finding tooth on the right side is 18 degrees. As shown in FIG. 3, if the center of the coded disc 150 is a point O, an angle ∠AOB is 6 degrees, an angle ∠AOC is 18 degrees, and the interval between said other range finding teeth 151 is 12 degrees. In the case of an anticlockwise rotation at the time of the scanning of the coded disc 150, the anticlockwise rotation has a point B as its starting point of 0 degree. The scanning of a one-degree angular interval is performed every other 555.5 μs. That is, the scanning period per revolution is 0.2 s, and 5 revolutions of scanning can be performed in every second.

If the scanning and distance measuring are performed synchronously by using the coded disc 150, firstly the rotation speed of the motor 120 needs to be set, for example, as 5 rev/sec, which means that the time for scanning each one-degree interval needs 555.5 μs. In an ideal condition, a distance corresponding to the one-degree rotation can be measured every other 555.5 μs. However, due to practical reasons, the local rotation speed of the motor is not even, and a situation where the local speed may be too fast or slow may occur, which causes that the scanning the one-degree interval needs for example 277.75 μs rather than 555.5 μs, and the speed is twice as fast. That is, the distance actually measured for the time of 555.5 μs is a distance corresponding to the two-degree rotation rather than the one-degree rotation, hereby rendering the measurement result of the scanning inaccurate. To solve such a problem, in the present invention, the control unit 140 is provided with a rotation speed feedback and adjustment unit. The 15 range finding teeth evenly provided on the circumference of the coded disc 150 divide the coded disc into 15 equal parts, among which the interval between the left edges of every two adjacent range finding teeth is 24 degrees. The set angle is defined as an angle of 24 degrees, i.e., an angle corresponding to the interval between the left edges of every two adjacent range finding teeth 151. For each rotation of the set angle, the detection portion 144 automatically calculates the corresponding local rotation speed N2 within the set angle and sends the rotation speed to the control unit 140. The control unit 140 is provided with a range of rotation speed threshold N0. If the local rotation speed N2 is not within the range of rotation speed threshold N0 (which is set as 290-310 rev/min in case of 5 rev/sec), the control unit 140 does not store the distance value measured within the set angle (that is, the distance value is regarded as unmeasured), but resets the rotation speed of the motor 120 to the initial rotation speed N1 (for example, 5 rev/sec) by adjusting the circuit voltage, and measures the distance value corresponding to each degree within the set angle again.

Specifically, the present invention further provides a range finding method for the laser range finding sensor mentioned above, and the method comprises the following steps:

Step 100: anticlockwise rotating the coded disc in the range finding sensor with the motor, wherein the motor has the initial rotation speed N1;

Step 200: measuring the distance value within the set angle as the range finding unit, and by a photoelectric encoder, automatically calculating the local rotation speed N2 of the motor within the range finding unit and sending the local rotation speed N2 to the control unit;

Step 300: in the control unit, presetting the first threshold N0 for the rotation speed of the motor;

Step 400: determining whether the local rotation speed N2 is within the range of the first threshold N0, if YES, proceeding to Step 500, and if NO, resetting the rotation speed of the motor to the initial rotation speed N1 by adjusting the circuit voltage by the control unit, and returning to Step 100; and Step 500: in the control unit, recording the distance value in Step 200.

The set angle in Step 200 is an angle across which the edges on the same side of two adjacent teeth among the plurality of range finding teeth on the coded disc span. The initial rotation speed N1 is 5-15 rev/sec.

Second Embodiment

Apparently, the number of the range finding tooth 151 provided evenly on the circumference of the coded disc 150 is not limited to 15, i.e. using ⅟15 of 360 degrees as a measuring unit, as in the first embodiment. In the second embodiment, 5 range finding teeth are provided evenly on the circumference of the coded disc 150, so one measuring unit in the present embodiment corresponds to an angle of 72 degrees, and the initial rotation speed N1 is correspondingly set as 15 rev/sec. The present embodiment differs from the first embodiment only in that the number of the provided range finding tooth is different, resulting in that the measuring units are different. The other technical features of the present embodiment are basically the same as those of the first embodiment, and the descriptions thereof will be omitted herein. Please refer to the foregoing contents for the details.

Obviously, in addition to the manners for providing the range finding tooth as described in the above two embodiments, it is achievable that the number of the range finding tooth is set as 36 (the coded disc 150 of 360 degrees is divided into 36 measuring units more finely), or even more. Theoretically, the larger the number of the provided range finding teeth is, the higher the frequency of the adjustment is, and accordingly the better the measurement accuracy and precision is. As a result, however, the whole structure of the apparatus becomes more complicated. On the contrary, the less the number of the provided range finding teeth is, the lower the frequency of the adjustment is, and accordingly the worse the measurement accuracy and precision is. As a result, the overall structure of the apparatus can be relatively simple and the cost is reduced. In practice, in order to provide a tradeoff between the precision and the manufacturing cost, the structure in which 15 range finding teeth are provided evenly in the first embodiment not only ensures the accuracy and precision but also provides the apparatus with a less complicated overall structure.

In conclusion, the present invention provides a laser range finding sensor and a range finding method therefor. The laser range finding sensor obtains the scanning data by synchronously scanning the coded disc, and with the help of a rotation speed feedback and adjustment unit, the laser range finding sensor precisely controls the rotation speed of the coded disc by automatically calculating a real-time rotation speed via a photoelectric encoder, inputting the real-time rotation speed in a control unit, and comparing the real-time rotation speed with a preset threshold of the rotation speed, hereby obtaining the distance information on two-dimensional cross section of each degree in one revolution. The laser range finding sensor has a simple structure and a high sensitivity.

What is claimed is:

1. A laser range finding sensor comprising a motor (120), a control box (130) and a coded disc (150), characterized in that, under a drive of the motor, the control box rotates relative to the coded disc;

the coded disc comprises a plurality of range finding teeth (151);

the control box comprises a range finding unit (142), a detection portion (144) and a control unit (140), the detection portion comprises a light transmitter (1440) and a light receiver (1441) disposed opposite to each other;

the control box rotates relative to the coded disc so that the range finding teeth pass between respective positions of the light transmitter and the light receiver;

the control box rotates under the drive of the motor for scanning and distance measuring, and records a measured distance value in the control unit;

the control unit automatically calculates a corresponding local rotation speed when the coded disc rotates by a set angle; and the control unit is connected to a rotation speed feedback and adjustment unit configured to adjust the rotation speed of the motor so that the control box is rotated at a constant speed.

2. The laser range finding sensor according to claim 1, characterized in that, if the control box (130) rotates anticlockwise, the set angle is an angle across which the left edges of every two adjacent range finding teeth among the plurality of range finding teeth evenly provided on the circumference of the coded disc (150) span.

3. The laser range finding sensor according to claim 2, characterized in that, the laser range finding sensor further comprises a base (110) on which the coded disc (150) is fixed.

4. The laser range finding sensor according to claim 3, characterized in that, an output terminal of the motor (120) is provided with a motor pulley (121), and an O-ring (122) is fitted around the outer circumferences of the motor pulley (121) and the control box (130), and the middle portion of the base (110) is connected with a bearing (160) having an outer race fixed to the base (110) and an inner race fixed to the control box (130).

5. The laser range finding, sensor according to claim 4, characterized in that, the number of the range finding teeth (151) provided on the circumference of the coded disc (150) is 5-15.

6. The laser range finding sensor according to claim 5, characterized in that, among the 5-15 range finding teeth (151), there is one tooth range finding tooth, the tooth width of which is smaller or larger than that of other range finding teeth.

7. The laser range finding sensor according to claim 6, characterized in that, the coded disc (150) comprises 15 range finding teeth (151) among which:

an interval between the lelt edges of every two adjacent range finding teeth is 24 degrees, an interval between the left and right edges of one range finding tooth is 6 degrees, an interval between the right edge of the one range finding tooth and the left edge of the range finding tooth adjacent to the one range finding tooth on the right side is 18 degrees, and an interval between the left and right sides of each of other range finding teeth is 12 degrees.

8. A range finding method for the laser range finding sensor according to claim 1, characterized in that, the method comprises the following steps:

Step 100: anticlockwise rotating a coded disc in the range finding sensor with a motor, wherein the motor has an initial rotation speed N1;

Step 200: measuring a distance value within the set angle as a range finding unit; and by a photoelectric encoder, automatically calculating a local rotation speed N2 of the motor within the range finding unit, and sending the local rotation speed N2 to a control unit;

Step 300: in the control unit, presetting a first threshold NO for the rotation speed of the motor:

Step 400: determining whether the local rotation speed N2 is within the range of the first threshold NO, if YES, proceeding; to Step 500, and if NO resetting the rotation speed of the motor to the initial rotation speed N1 by adjusting a circuit voltage by the control unit, and returning to Step 100; and Step 500: recording the distance value of Step 200 in the control unit.

9. The range finding method according to claim 8, characterized in that, the set angle in Step 200 is an angle across which the edges on the same side of every two adjacent teeth among the plurality of range finding teeth on the coded disc span.

10. The range finding method according to claim 9, characterized in that, the initial rotation speed N1 is 5-15 rev/sec.

* * * * *

UNITED STATES PATENT AND TRADEMARK OFFICE
CERTIFICATE OF CORRECTION

PATENT NO. : 10,175,357 B2
APPLICATION NO. : 15/038328
DATED : January 8, 2019
INVENTOR(S) : Jinju Tang Page 1 of 1

It is certified that error appears in the above-identified patent and that said Letters Patent is hereby corrected as shown below:

In the Claims

At Column 7, Line 1 (Claim 7, Line 4), please delete "the lelt edges" and insert --the left edges-- therefor;

At Column 8, Lines 1-2 (Claim 8, Lines 12-13), please delete "a first threshold NO" and insert --a first threshold N0-- therefor;

At Column 8, Line 4 (Claim 8, Line 15), please delete "the first threshold NO," and insert --the first threshold N0,-- therefor.

Signed and Sealed this
Fifth Day of March, 2019

Andrei Iancu
*Director of the United States Patent and Trademark Office*